No. 725,243. PATENTED APR. 14, 1903.
C. B. GOODSPEED.
PNEUMATIC CLUTCH.
APPLICATION FILED OCT. 3, 1902.
NO MODEL.
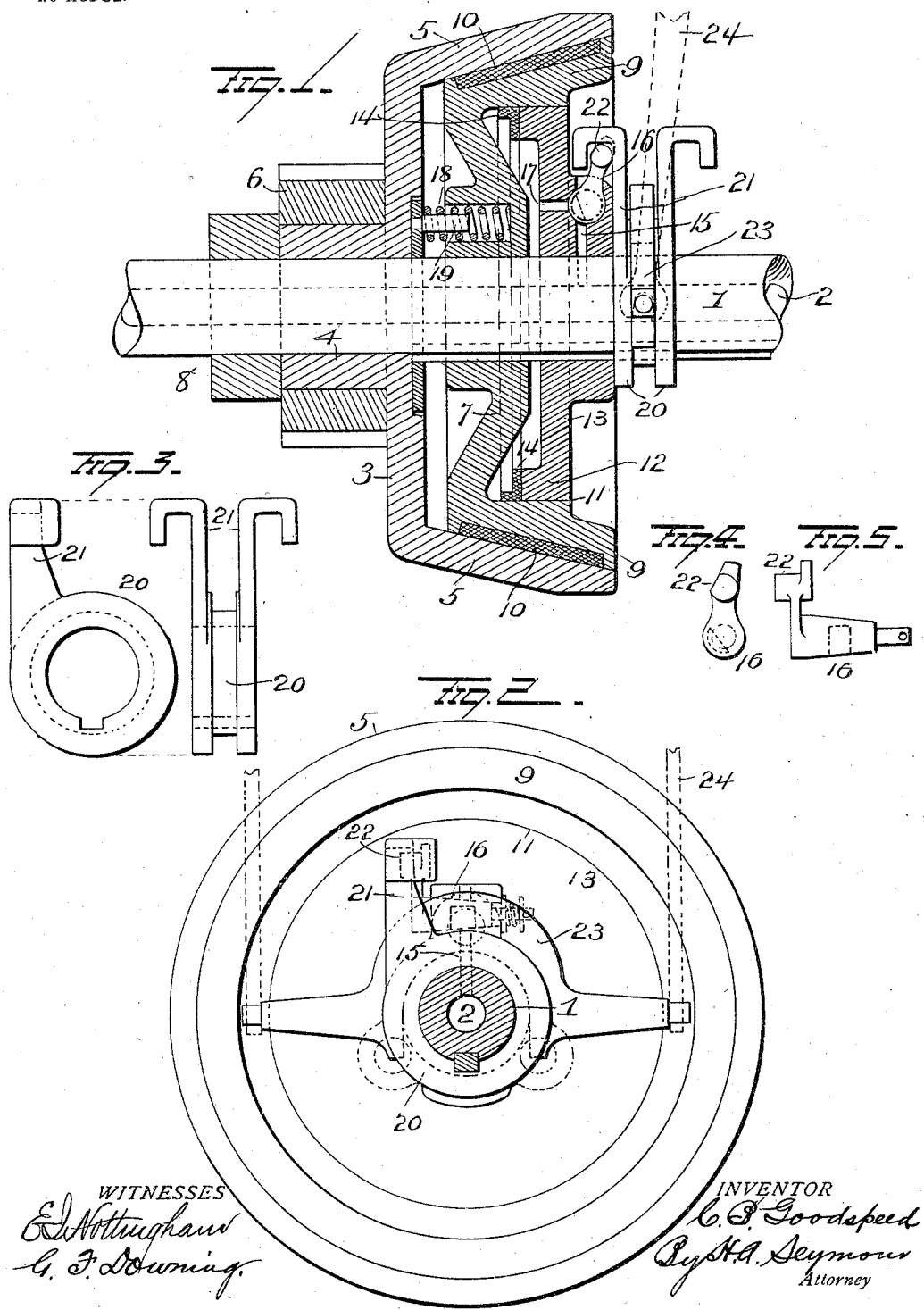
WITNESSES
INVENTOR
C. B. Goodspeed
By H. A. Seymour
Attorney

UNITED STATES PATENT OFFICE.

CHARLES B. GOODSPEED, OF COLUMBUS, OHIO.

PNEUMATIC CLUTCH.

SPECIFICATION forming part of Letters Patent No. 725,243, dated April 14, 1903.

Application filed October 3, 1902. Serial No. 125,806. (No model.)

*To all whom it may concern:*

Be it known that I, CHARLES B. GOODSPEED, of Columbus, in the county of Franklin and State of Ohio, have invented certain new and useful Improvements in Pneumatic Clutches; and I do hereby declare the following to be a full, clear, and exact description of the invention, such as will enable others skilled in the art to which it appertains to make and use the same.

My invention relates to pneumatic clutches designed for use upon rotary machinery in which one portion may be kept constantly running, while the other portion is subject to stops; and it consists in the parts and combinations of parts, as will be more fully described, and pointed out in the claims.

In the accompanying drawings, Figure 1 is a view in transverse section of the clutch, showing the power-shaft and clutch-power in elevation. Fig. 2 is a view in elevation looking toward the clutch-collar. Fig. 3 is a view in elevation of the clutch-collar, and Figs. 4 and 5 are detached views of the actuating-valve.

1 represents a power-shaft having a central bore 2, which is in direct communication with an air-pump or other source of air-supply.

3 is the power-transmitting element, comprising a disk having a collar 4 and a conical flange 5. The collar 4 forms a seat for the pinion 6, which latter may be integral with the collar or be separate therefrom and keyed thereto. This power-transmitting element 3 is loosely mounted on the shaft 1 and forms, in effect, the casing or housing in which the friction element of the device rests. This friction element comprises a flanged disk 7, having a spline connection with shaft 1, whereby the disk rotates with the shaft, but is free to have a limited sliding movement thereon. The power-transmitting element 3 is locked against endwise movement in a direction away from disk 7 by the split collar 8, rigidly fastened to shaft 1. Hence when the disk or friction element 7 is forced, as hereinafter described, toward disk 3 the latter will be held against endwise movement on shaft 1 and be compelled to turn with the part 7. The flange 9 of friction element 7 is conical to correspond with the conical inner face of the flange 5 and is preferably faced with a wood or other friction-surface 10, as clearly shown in Fig. 1. The inner face of flange 9 is provided with a cylindrical recess, as shown at 11, to receive the peripheral flange 12 of the disk 13. This flange is cylindrical exteriorly and fits loosely within the cylindrical recess or chamber formed in the outer face of disk 7, so as to make an air-tight connection therewith, and is provided with a leather, rubber, or other flexible packing-ring 14, which is so constructed as to expand against the cylindrical casing and prevent the possibility of the loss of air. This disk 13 is keyed to shaft 1 against any movement whatsoever and is provided with ports 15 and 17, the former leading to the bore 2 of shaft 1, and it also carries the rocking valve 16, which is located at the juncture of the ports 15 and 17. When the rocking valve is in the position shown in Fig. 1, the ports 15 and 17 are in communication, thus permitting air to freely enter the chamber formed by the disks 13 and 7 and their respective flanges and force the disk 7 toward disk 3. This movement of the disk 7 toward disk 3 brings its flange 9 against conical flange 5 and produces friction sufficient to lock disk 3 and its pinion 6 to shaft 1, thus transmitting the motion of the latter to the parts to be driven. The disk 7 is returned to its normal position when the air-pressure against it has been removed, which is effected by moving the crank-arm 22 of the valve outwardly, which operates to close the part 15 and permit the air to escape through part 17 into the open air by the springs 18, which, as clearly shown in Fig. 1, are seated on studs 19, carried by disk 3, and enter recesses formed in disk 7. The valve 16 is actuated by the clutch-collar 20. This collar is slidingly mounted on shaft 1, but rotates with the latter, and is provided with an upwardly-projecting hooked arm 21, which latter takes over the crank 22 of valve 16 and operates to positively rock the valve in directions to open and close communication between the ports 15 and 17. This clutch-collar is actuated by yoke 23, which is connected to either a foot or hand lever 24.

With the construction as above described and which is applicable to automobiles it is evident that upon establishing communication between the bore 2 of shaft 1 and the chamber formed by the disk 13 and friction element 7 the latter will be moved away from the disk and into frictional engagement with the flange 5 of the power-transmitting element 3, and thus transmit the motion of shaft 1 to the parts to be driven thereby.

It is evident that changes in the construction and relative arrangement of the several parts might be made without avoiding my invention, and hence I would have it understood that I do not restrict myself to the particular construction and arrangement of parts shown and described; but, Having fully described my invention, what I claim as new, and desire to secure by Letters Patent, is—

1. In a friction-clutch, the combination with a hollow power or driving shaft, a friction-disk loosely mounted on the power-shaft, a friction-disk keyed to the power-shaft and adapted to be moved longitudinally thereon, and a disk secured to the power-shaft and constructed to form a closed chamber between its inner surface and the sliding friction-disk, of ports for admitting air to said closed chamber, a valve for controlling the flow of air from the hollow shaft to said chamber and from the latter to the open air, and a sliding collar and means connected therewith for actuating it and operating the valve, substantially as set forth.

2. In a friction-clutch, the combination with a hollow power-shaft, two flanged friction-disks one loosely mounted on the power-shaft, and the other keyed thereto and adapted to slide thereon, of a disk secured to the power-shaft and constituting one wall of a closed air-chamber, ports leading from the disk for controlling the supply of air, and a spring for separating the friction-disks, substantially as set forth.

In testimony whereof I have signed this specification in the presence of two subscribing witnesses.

CHARLES B. GOODSPEED.

Witnesses:
ERNEST T. HARE,
J. W. GLAZE.